(12) United States Patent
Guchhait et al.

(10) Patent No.: US 11,864,018 B2
(45) Date of Patent: Jan. 2, 2024

(54) ENABLING 2G AND 3G CELLULAR RADIO COMMUNICATIONS OVER A PACKET-BASED OPEN RADIO ACCESS NETWORK FRONTHAUL INTERFACE

(71) Applicant: Mavenir Systems, Inc., Richardson, TX (US)

(72) Inventors: Atanu Guchhait, Solna (SE); Charles Santhosam Lourdu Raja, Bangalore (IN); Wessam Afifi Ahmed, Plano, TX (US); John Melvin John William, Mysore (IN)

(73) Assignee: Mavenir Systems, Inc., Richardson, TX (US)

( * ) Notice: Subject to any disclaimer, the term of this patent is extended or adjusted under 35 U.S.C. 154(b) by 0 days.

(21) Appl. No.: 17/730,291

(22) Filed: Apr. 27, 2022

(65) Prior Publication Data

US 2022/0353828 A1 Nov. 3, 2022

Related U.S. Application Data

(60) Provisional application No. 63/318,215, filed on Mar. 9, 2022.

(30) Foreign Application Priority Data

Apr. 29, 2021 (IN) .............................. 202121019773

(51) Int. Cl.
*H04L 69/00* (2022.01)
*H04L 69/18* (2022.01)
(Continued)

(52) U.S. Cl.
CPC ......... *H04W 28/0247* (2013.01); *H04L 69/18* (2013.01); *H04L 69/26* (2013.01);
(Continued)

(58) Field of Classification Search
CPC ......... H04B 7/02–17; H04L 69/02–40; H04W 28/02–26; H04W 36/0005–385;
(Continued)

(56) References Cited

U.S. PATENT DOCUMENTS

2020/0220759 A1 7/2020 Katzav et al.
2021/0045193 A1 2/2021 Mishra et al.
(Continued)

OTHER PUBLICATIONS

Jordan Eugina: "Open RAN functional splits, explained", Feb. 24, 2021 (Feb. 24, 2021), XP055961023, Internet; Retrieved from the Internet: URL:https://www.5gtechnologyworld.com/open-ran-functional-splits-explained/ (Year: 2021).*
(Continued)

*Primary Examiner* — Timothy J Weidner
(74) *Attorney, Agent, or Firm* — Ruggiero, McAllister & McMahon LLC

(57) ABSTRACT

There is provided an Open Radio Access Network (O-RAN) that includes a fronthaul interface over which an O-RAN Distributed Unit (O-DU) and an O-RAN Radio Unit (O-RU) communicate with one another and exchange O-RAN standard defined user-plane (U-plane) packets and control-place (C-Plane) packets. The fronthaul interface carries control and management information via management-plane (M-Plane) message exchange, and timing synchronization is achieved in accordance with synchronization-plane (S-Plane) procedures, and the O-RAN accommodates communications via 2G and 3G based mobile networks.

11 Claims, 13 Drawing Sheets

(51) Int. Cl.
*H04W 28/02* (2009.01)
*H04W 48/02* (2009.01)
*H04W 52/52* (2009.01)
*H04W 56/00* (2009.01)
*H04W 84/02* (2009.01)
*H04W 88/10* (2009.01)
*H04W 88/12* (2009.01)
*H04W 92/02* (2009.01)
*H04W 92/12* (2009.01)

(52) U.S. Cl.
CPC .......... *H04W 48/02* (2013.01); *H04W 52/52* (2013.01); *H04W 56/001* (2013.01); *H04W 84/02* (2013.01); *H04W 88/10* (2013.01); *H04W 88/12* (2013.01); *H04W 92/02* (2013.01); *H04W 92/12* (2013.01)

(58) Field of Classification Search
CPC ..... H04W 48/02–20; H04W 52/02–60; H04W 56/0005–0095; H04W 60/005–06; H04W 76/10–50; H04W 80/02–12; H04W 84/005–22; H04W 88/005–188; H04W 92/02–24
See application file for complete search history.

(56) References Cited

U.S. PATENT DOCUMENTS

2021/0409977 A1* 12/2021 Dussmann ........ H04W 28/0231
2023/0108782 A1* 4/2023 Kang ................ H04W 28/0231

OTHER PUBLICATIONS

O-RAN.WG4.CUS.0-v05.00 "O-RAN Fronthaul Working Group: Control, User and Synchronization Plane Specification" Feb. 28, 2021 (Year: 2021).*
Extended European Search report for corresponding European patent application EP22170616.1, 11 pages, dated Oct. 20, 2022.
Jordan Eugina: "Open RAN functional splits, explained",Feb. 24, 2021 (Feb. 24, 2021), XP055961023, Internet; Retrieved from the Internet: URL:https://www.5gtechnologyworld.com/open-ran-functional-splits-explained/.
Alimi Isiaka A. et al: "Functional Split 1 Perspectives: A Disruptive Approach to RAN Performance Improvement", Wireless Personal Communications.,vol. 106, No. 1, May 21, 2019 (May 21, 2019),pp. 205-218, XP55960742, Springer.
O-RAN.WG4.CUS.0-v05.00 "O-RAN Fronthaul Working Group: Control, User and Synchronization Plane Specification" Feb. 28, 2021.

* cited by examiner

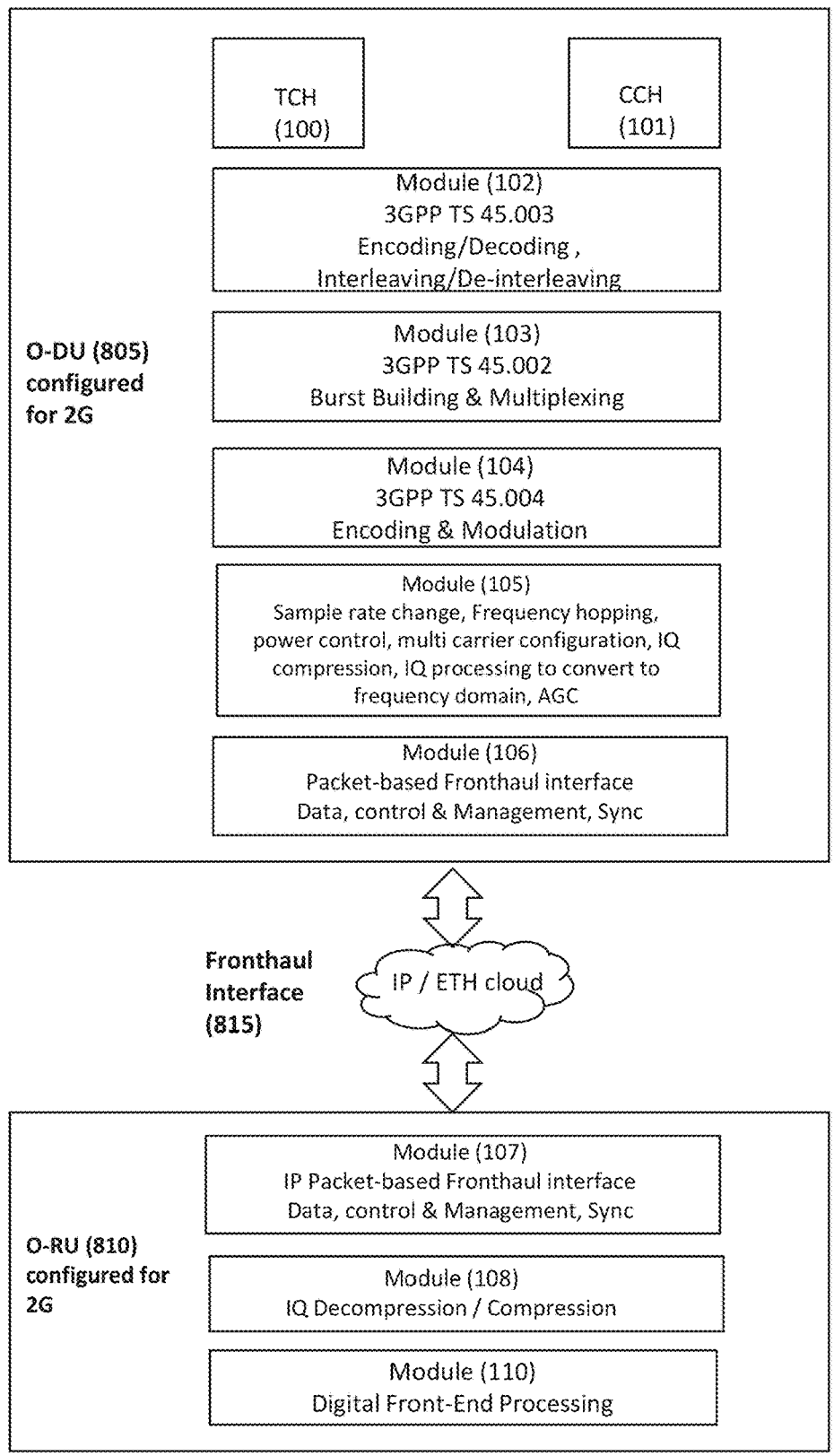
FIG. 1.1A

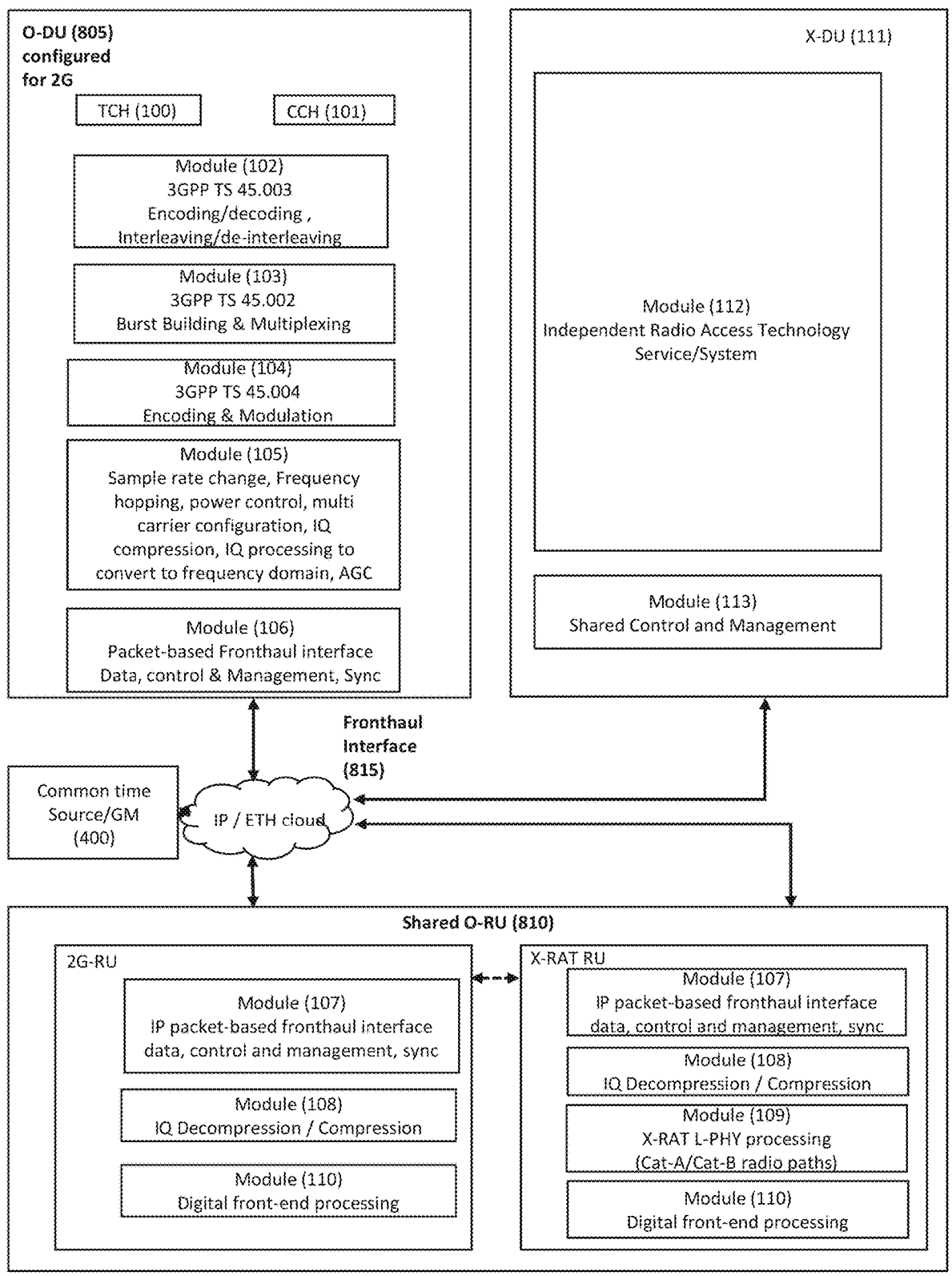
FIG. 1.1B

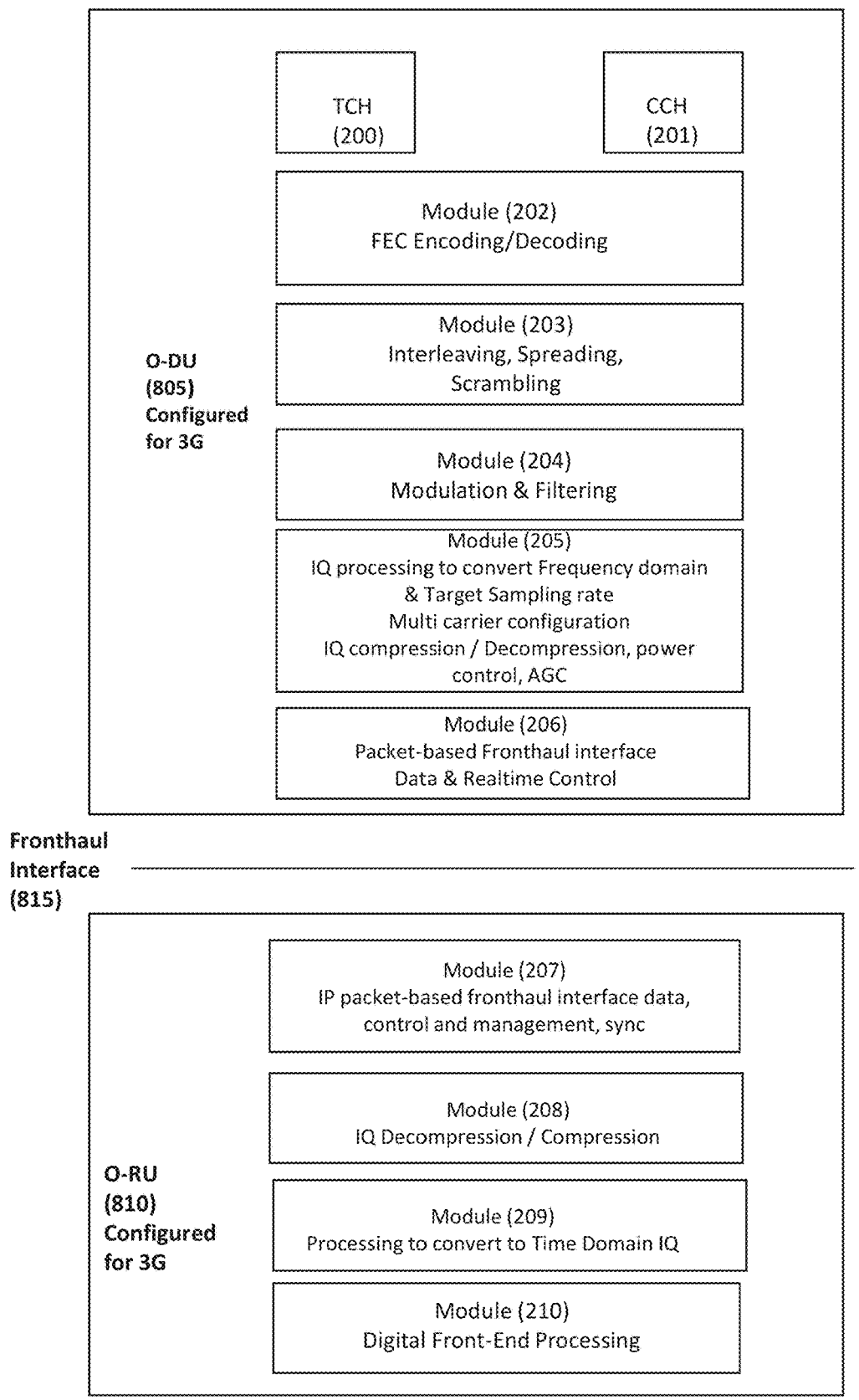
FIG. 1.2A

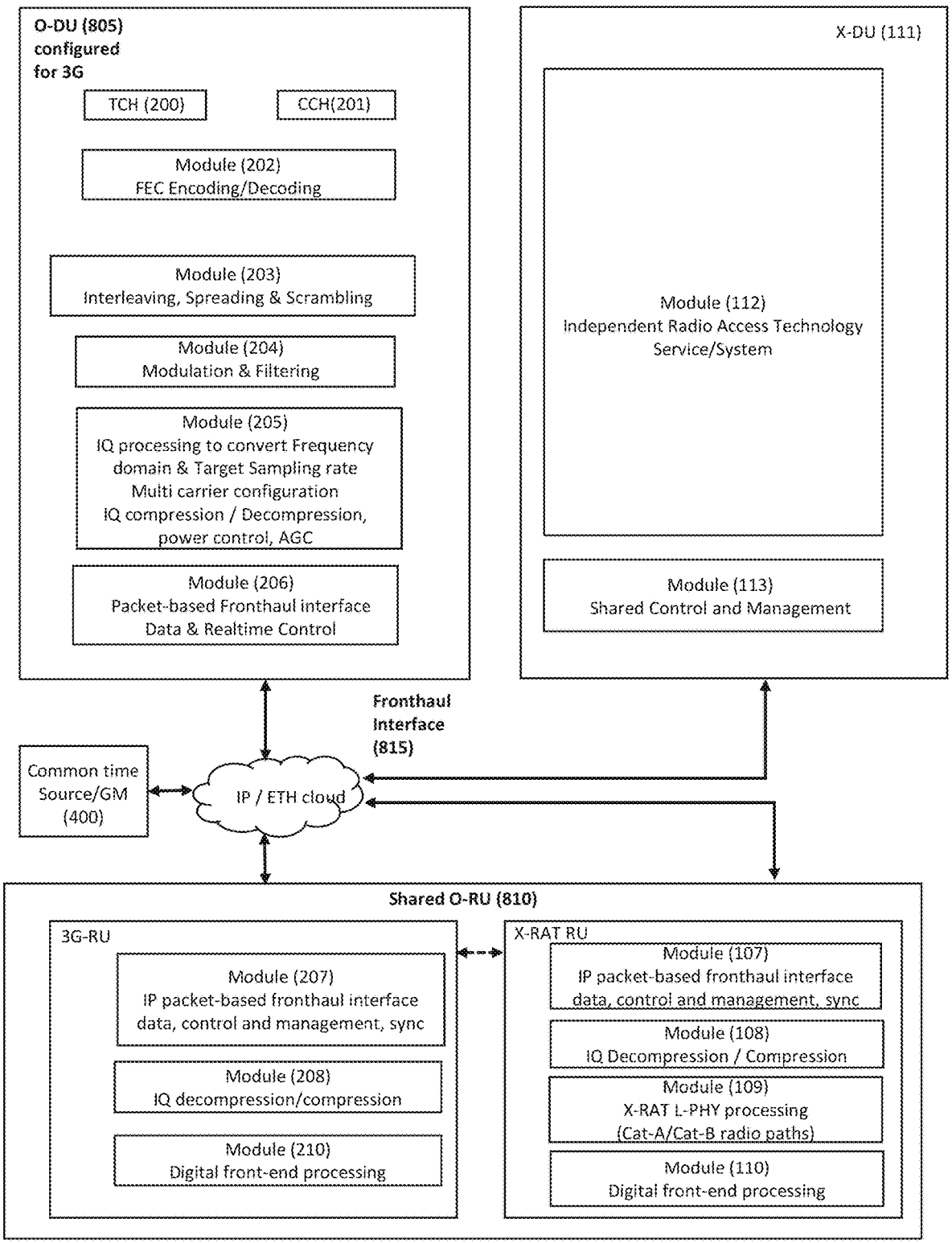
FIG. 1.2B

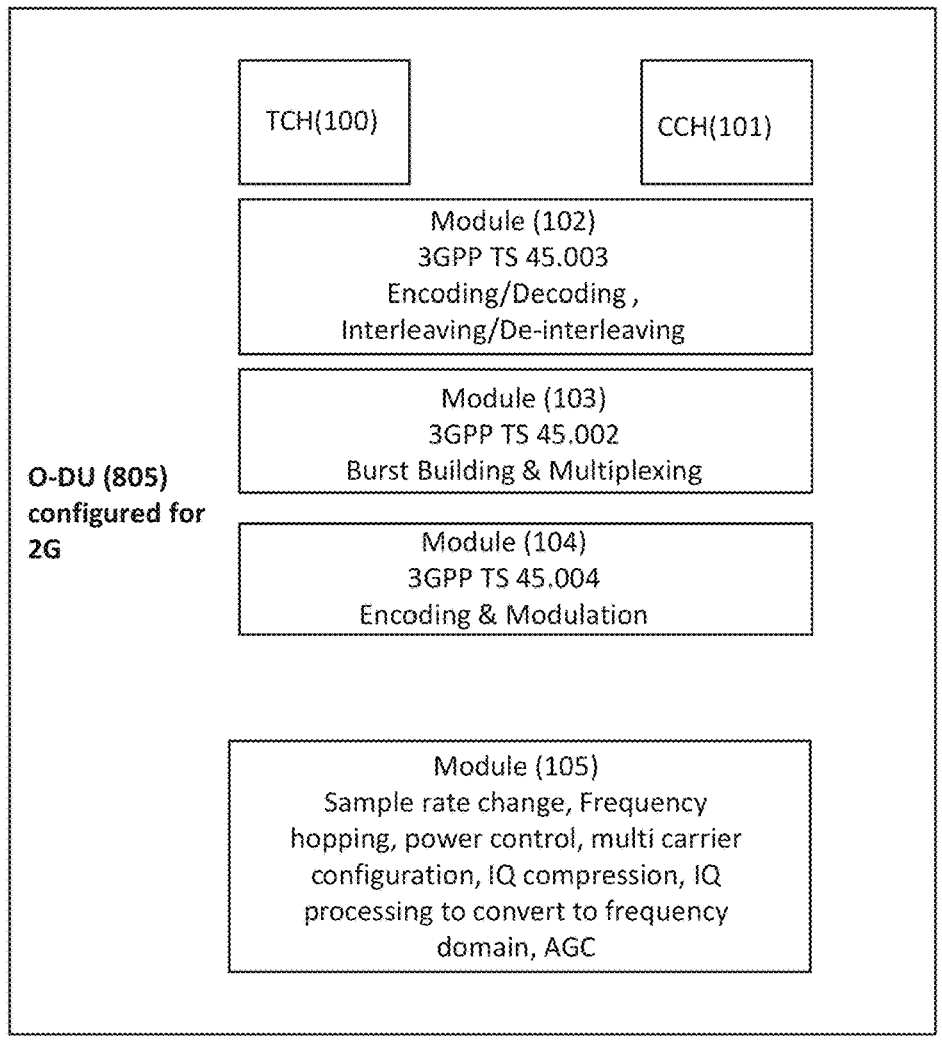
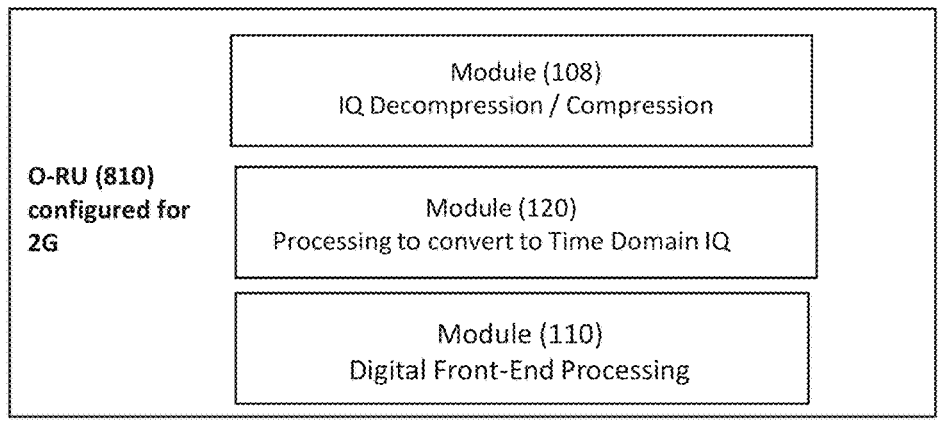
FIG. 1.3A

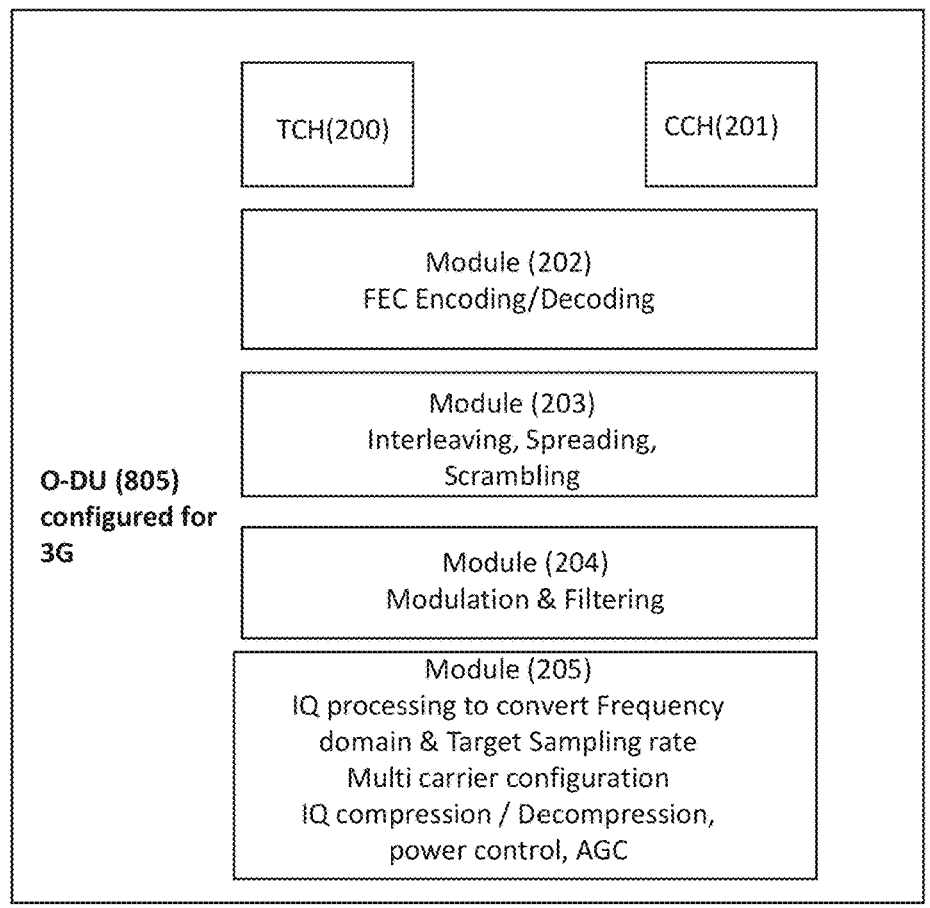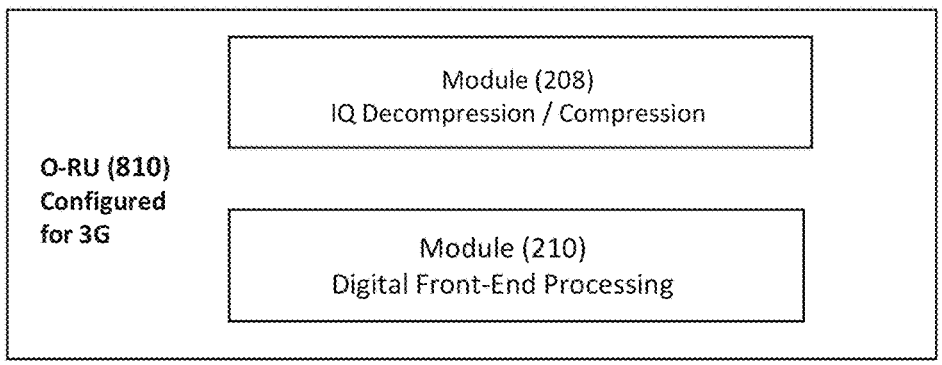
FIG. 1.3B

| | | | | | | | No of bytes | | Description of the U-plane fields for GSM |
|---|---|---|---|---|---|---|---|---|---|
| | GSM frame format - Keeping LTE format as is for U-plane TD-IQ | | | | | | | | |
| ecpriVersion | | | ecpriReserved | | | ecpriConcatenation | 1 | Octet 1 | Standard eCPRI Header Definition |
| ecpriMessage | | | | | | | 1 | Octet 2 | |
| ecpriPayload | | | | | | | 2 | Octet 3 | |
| ecpriRtcid / ecpriPcid | | | | | | | 2 | Octet 5 | |
| ecpriSeqid | | | | | | | 2 | Octet 7 | |
| dataDirection | payloadVersion = 2.0 for FS-8 | | filterIndex | | | | 1 | Octet 9 | GSM payload version =2.0 for FS-8 data |
| frameId | | | | | | | 1 | Octet 10 | Data Direction 0/1 - DL/UL . Frame ID: 0-255, Filter Index = 0 |
| subframeId | | | slotId | | | | 1 | Octet 11 | subframe ID : 0:9 / Slot ID = 0 |
| slotId | | symbolId | | | | | 1 | Octet 12 | Symbol ID: 0:14 |
| sectionId | | | | | | | 1 | Octet 13 | Use Section Id = 0(Only one section) |
| sectionId | | | rb | symInc | startPrbu | | 1 | Octet 14 | rb=0, symInc=0, startPrbu = 0 |
| startPrbu | | | | | | | | Octet 15 | startPrbu = 0 and numPrbu: Organise them to represent number of prbs(12 I/Qs) in U-plane packet.Example to carry 1024 FD IQ samples, startPrbu = 0 and numPrbu = (1024/12)=86, RU should represent it as 86*12+round to nearest multiples of 12 |
| numPrbu | | | | | | | | Octet 16 | |
| udCompHdr | | | | | | | | Octet 17 | IQ compression used in IQ-BFP, A-law/u-law (Optional in phase 1) |
| reserved | | | | | | | | Octet 18 | |
| udCompParam (I_0 sample) | | | | | | | | Octet 19 | |
| ISample (Q_0 sample) | | | | | | | | Octet 20 | |
| (Q_0 sample) | | | | | | | | | |
| ... | | | | | | | | | |
| Q_1023 sample | | | | | | | | | |
| Q_1023 sample | | | | | | | | Octet 4153 | |

FIG. 2

| Bits # | O-RAN Description | Bit-Definition Modified for 2G/3G | 2G/3G Interpretation | Comments |
|---|---|---|---|---|
| 1 | dataDirection | Not changed | 0 – DL, 1-UL | No change |
| 3 | payloadVersion | Not changed | 1 – 2G/3G U-Plane FD Data<br>2 – 2G/3G U-Plane TD data | M-Plane YANG parameter list supported-technology-dl /-ul will indicate the transported technology in the U-plane packets |
| 4 | filterIndex | Not changed | 0 – Standard | No other filter index is used |
| 8 | frameId | Not changed | Counter for 10ms frames, 0:255 | No change |
| 4 | subframeId | Not changed | Counter for 1ms frames, 0:9 | No change |
| 6 | slotId | Not changed | 0 (1 slot in 1ms) | Only 0 is used |
| 6 | startSymbolid | Not changed | 0:14 (15 symbols per 1ms subframe) | 2G/3G: 15 symbols per 1ms subframe |
| 12 | sectionId | Not changed | 0 | One section defined for 2G/3G |
| 1 | rb | Not changed | 0 | No rb, all samples used |
| 1 | symInc | Not changed | 0 | No symb number increment in current symbol |
| 10 | startPrbc | Not changed | 0 | Not used, set to 0 |
| 8 | numPrbu | Not changed | Set to match the multiples of 12 (ceil(N/13)) | Represent as number of prbs(12 I/Q pairs) in U-plane packet.<br>Example: 1024 IQs, startPrbu =0 and numPrbu = ceil1024/13) = 86. RU should represent it as (86 *12) rounded to nearest power of 2 (1024) |
| 8 | udCompHdr | Not changed | No change | This can be feature for 2nd phase |

FIG. 3

| Bits# | O-RAN Description | Bit-Definition modified for 2G/3G | 2G/3G Interpretation | Comments |
|---|---|---|---|---|
| 4 | eCPRI Version | Not Changed | No changes | No Change(Support atleast eCPRI standard version 2.0) |
| 3 | eCPRIReserved | Not Changed | No changes | Set to 0, No Change |
| 1 | eCPRIConcatenation | Not Changed | No changes | No Change, follow |
| 8 | eCPRIMessage | Not Changed | No changes | Support all the default message types<br>0000 0000<br>0000 0010<br>0000 0101 |
| 16 | eCPRIPayload | Not Changed | No changes | Default payload sizes is supported |
| 16 | ecpriRtcid/ecpriPcid | Not Changed | DU_Port_ID-No Changes<br>BandSectorID-No Changes<br>CC_ID:Used for indicating center carrier<br>RU_Port_ID:Represents single or multiple FS-8 RAT Trx for one Antenna path, or combinations of FS-8, FS-7.2x TRX paths for one antenna path | FS-8 RAT(2G, 3G) RU_Port_ID indicates IQ flows having multiple FS-8 RAT TRx in combination with optional wideband FS 7.2x RAT TRx |
| 16 | ecpriSeqid | Not Changed | No changes, Support for U plane is needed for 2G/3G operations | No separate sequence Id generation and tracking needed for C-Plane |

FIG. 4 a) RoEsubType:

a. U-Plane

| RoE subType | OUI/CID subType mapping table (.mapSubtype) ||
| --- | --- | --- |
| | OUI/CID Mapping (3 bytes)<br>bit39 <------------------------------ | Payload structure mapping (2 bytes)<br>-------------------------------------------------<br>---> bit 0 |
| 128 | xRAN=0xFAEB6E | 0x0001, IQ (No concatenation) | b. C-Plane

| RoE subtype | OUI/CID subType mapping table (.mapSubtype) ||
| --- | --- | --- |
| | OUI/CID Mapping (3 bytes)<br>bit39 <------------------------------ | Payload structure mapping (2 bytes)<br>-------------------------------------------------<br>---> bit 0 |
| 130 | xRAN=0xFAEB6E | 0x0003, Ctrl (No concatenation) | c. RoEorderInfo (order information)

| Field | Length | Change note to support FS-8 RATs |
| --- | --- | --- |
| DU_Port_ID | 16 bits | No change |
| BandSector_ID | | No change |
| CC_ID | | No Change |
| RU_Port_ID | | Not Used. Set to 0 |
| Sequence_ID | 8 bits | U-Plane sequence ID is needed<br><br>C-Plane Type-0 sequence ID may be needed |
| E_Bit | 1 bit | No change |
| Subsequence_ID | 7 bits | Not used, set to 0 |

FIG. 5

| Bits# | O-RAN Description | Bit-Definition modified for 2G/3G | 2G/3G Interpretation | Comments |
|---|---|---|---|---|
| 3 | PayloadVersion | No Change | 1-2G/3G U-plane FD data 2-2G/3G U-plane TD data | M-plane YANG parameter list supported-technology-dl /-ul will indicate the transported technology in the U-plane packets |
| 4 | FilterIndex | No Change | 0 | Set to 0 |
| 4 | slotId | No Change | 0 | Set to 0 |
|  | startSymbolID | No Change | Symbol ID range 0-14 for 2G/3G Symbol ID range 0-13 for 4G and NR |  |
| 8 | numberOfSections | No Change | Set to 1 | To support Type-0 one section C-plane |
| 8 | cpLength | No Change | Set to 0 | Not used |
| 8 | sectionId | No Change | Set to 0 |  |
| 1 | Rb | No Change | Set to 0 | Not used |
| 1 | symInc | No Change | Set to 0 | Not used |
| 10 | startPrbc | No Change | Set to 0 | Not used |
| 8 | numPrbc | No Change | Set to 0 | Not used |
| 4 | reMask | No Change | Set to 0 | Not used |

FIG. 6

ENABLING 2G AND 3G CELLULAR RADIO COMMUNICATIONS OVER A PACKET-BASED OPEN RADIO ACCESS NETWORK FRONTHAUL INTERFACE

BACKGROUND OF THE DISCLOSURE

1. Field of the Disclosure

The present disclosure relates to a radio access network (RAN), and more particularly, a RAN design that accommodates 2G and 3G based mobile networks.

2. Description of the Related Art

The approaches described in this section are approaches that could be pursued, but not necessarily approaches that have been previously conceived or pursued. Therefore, the approaches described in this section may not be prior art, and are not admitted prior art by inclusion in this section.

The present document, near its end, includes a list of acronyms and a list of definitions.

Open-RAN (O-RAN) standard based packet networking fronthaul interfaces between a distributed unit (DU) and a radio unit (RU) for 4G and new radio (NR) 5G radio access technologies (RAT) have gained huge attention from wireless cellular communication industries. A primary reason for such growth includes an O-RAN standard allowing interoperability and standardization of RAN components, primarily O-DU and O-RU through including a unified interconnection standard over packet-based transport interfaces like eCPRI and RoE. This has enabled seamless integration of white-box hardware and open-source software elements from different component vendors for O-DUs and O-RUs.

O-RAN standard supports 4G and 5G NR radio access technologies (RAT) based layer 1 functional split 7.2x (FS-7.2x) where frequency domain data IQ samples and related control, management and synchronization information is carried over a fronthaul (FH) interface. This allowed 4G and NR base-station systems (eNB and gNB) to be designed and deployed more cost effectively and efficiently thus reducing CAPEX and OPEX significantly.

In the current O-RAN standard, packet-based FH interface supports only FS-7.2x RAT operations, and thus defines frequency-domain IQ data transfer mechanism over FH using O-RAN specified CUS- and M-Plane standards. 2G and 3G radio access technologies traditionally use streaming interface-based FH connections to carry time-domain IQ samples to or from an O-RU. The O-RAN standard in its current form does not support RATs with FS-8, which do not have any frequency-domain operations defined in their respective RAT standards.

The current fronthaul O-RAN standards for the control, user, and synchronization planes (CUS-Plane) and management plane (M-Plane) support only 4G LTE and 5G NR RATs. Specifically, the O-RAN standard in its current form does not provide any support to carry functional split-8 (FS-8) RAT time domain IQ data, control, and related management information over the FH interface. Enhancements in multiple aspects are needed in the O-RAN standard for seamless integration of 2G and 3G RATs supporting functional split FS-8 with newer RATs (4G and NR) supporting FS-7.2x.

SUMMARY OF THE DISCLOSURE

The present document discloses a set of enhancements to the current O-RAN standard. A set of innovations around system, O-DU and O-RU architectures, and methods are disclosed to extend the capability of the present O-RAN FH interface standard, generalized as a packet-based FH transport standard, to carry FS-8 RAT time domain IQ data, control, and management information over the same FH interface without impacting existing operations for FS-7.2x RATs, thus allowing traditional 2G and 3G radio IQ data transmissions and reception to/from an O-RU. Hence, unified O-DU and O-RU designs are emerged. The present document uses the terms O-DU and DU interchangeably, and also uses the terms O-RU and RU interchangeably.

Systems and methods disclosed herein allow 2G and 3G RAT generated time-domain IQ data to be carried in downlink and uplink directions as per functional split-8 (FS-8) over generalized networks such as packet-based O-RAN FH transport network. Thus, the systems and methods disclosed herein will significantly extend the capability support of the current O-RAN standard (such packet interface-based FH interface standards) to any RATs supporting FS-8 as well as FS-7.2x standalone or simultaneously. Content of the packet-based FH interface packets can be determined by the Layer1 standard of the RAT without limiting the FH capability or radio operation capability.

The systems and methods disclosed herein augment the current O-RAN standard, and in general, any packet-based FH transport standard. Systems designed based on such an enhanced O-RAN standard will allow seamless integration and deployment of both legacy (2G and 3G) and new RATs using the same O-RAN FH standard.

There is thus provided an Open Radio Access Network (O-RAN) that includes a fronthaul interface over which an O-RAN Distributed Unit (O-DU) and an O-RAN Radio Unit (O-RU) communicate with one another and exchange O-RAN standard defined user-plane (U-plane) packets and control-place (C-Plane) packets. The fronthaul interface carries control and management information via management-plane (M-Plane) message exchange, and timing synchronization is achieved in accordance with synchronization-plane (S-Plane) procedures, and the O-RAN accommodates communications via 2G and 3G based mobile networks.

BRIEF DESCRIPTION OF THE DRAWINGS

FIGS. 1.1A and 1.1B are block diagrams of single RAT (2G) and multi-RAT (2G and any other FS-7.2x RAT) solution (one antenna path or multiple antenna paths) architectures in a mix of single and multimode operation.

FIGS. 1.2A and 1.2B are block diagrams of systems that provide packet-based FH interface for supporting standalone 3G RAT and multi-RATs (FS-8 for 3G and FS-7.2x for 4G/5G) in a mix of single and multimode operation.

FIGS. 1.3A and 1.3B are O-RAN split diagrams for DL/UL data transfers for selected FS-8 RATs.

FIG. 2 is a representation of U-Plane Frame structure and header field formats to carry FS-8 RAT IQ samples to/from an O-RU over a FH interface.

FIG. 3 is a table of O-RAN compliant U-Plane header field definitions for 2G/3G operations.

FIG. 4 shows eCPRI header fields representation for FS-8 RATs 2G and 3G U-Plane packets, and also shows usage of the existing eCPRI packet header fields definitions that can be applicable to both O-RAN U-Plane and C-Plane Type-0 packets.

FIG. 5 is a representation of RoE header fields (namely RoEsubTypes and RoEorderinfo) for 2G and 3G U-Plane and C-Plane Type-0 packets.

FIG. 6 is a representation of idle slot scheduling frame format (C-Plane Section Type-0) for FS-8 RATs.

DESCRIPTION OF THE DISCLOSURE

The present document discloses an O-RAN that includes a fronthaul interface over which an O-DU and an O-RU communicate with one another and exchange O-RAN standard defined U-plane packets and C-Plane packets. The fronthaul interface carries control and management information via M-Plane message exchange, timing synchronization is achieved in accordance with S-Plane procedures, and the O-RAN accommodates communications via 2G and 3G based mobile networks.

Figure 8:
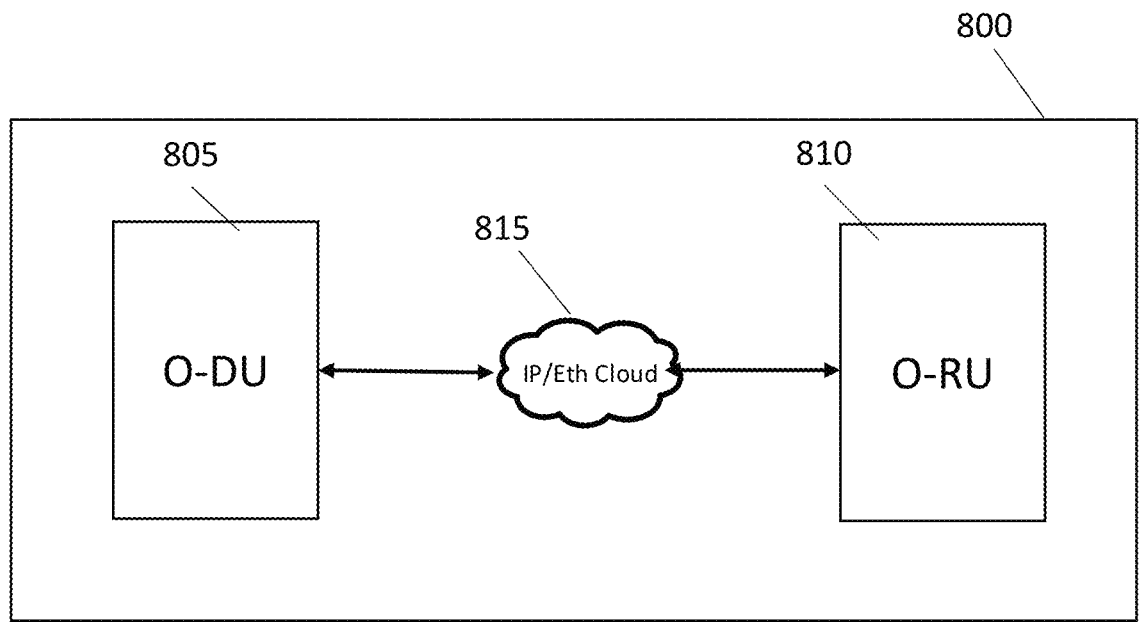
FIG. 8 is block diagram of a system of a single RAT radio access solution where an O-DU communicates with an O-RU over an O-RAN fronthaul.

FIG. 8 is a block diagram of an O-RAN, namely system 800, of a single RAT radio access solution where an O-DU 805 communicates with an O-RU 810 over an O-RAN packet-based FH interface, i.e., FH 815, also designated herein as an IP/Ethernet (Eth) cloud. The techniques disclosed herein augment the current O-RAN standard where, at a minimum, O-DU 805 communicates to O-RU 810 over FH 815 by exchanging O-RAN standard defined U-Plane and C-Plane packets. Additional static C&M information is carried over M-Plane message exchange over FH 815. Timing synchronization is achieved over S-Plane procedures defined in the O-RAN standard.

Systems and methods described herein are applicable to systems supporting multi-RAT radio access solution without any major structural modifications.

Section 1: System and architecture of a packet-based FH interface, i.e., FH 815, definition capable of carrying RATs supporting FS-8 along with FS-7.2x (not mandatory to be active in the system)

Section 1.1: O-DU 805-O-RU 810 Architecture for 2G RAT interfaced through packet-based FH Single RAT and multi-RAT solutions (one antenna path or multiple antenna paths) architecture is presented here for 2G RAT.

FIGS. 1.1A and 1.1B are block diagrams of systems that provide single RAT and multi-RAT solution (one antenna path or multiple antenna paths) architectures for 2G RAT. Here x-RAT indicates RATs supporting FS-7.2 (LTE/NR). In addition, each of these architectures can support multiple component carriers from one or different types of FS-8 RATs (homogeneous or heterogeneous combination of 2G and 3G RATs). These architectures provide a packet-based FH Interface, i.e., FH 815, to support FS-8 RATs with or without FS-7.2x RATs in mix of single and multimode operation. Example FS-8 RAT is 2G and FS-7.2x RAT is LTE.

Section 1.2: O-DU 805-O-RU 810 Architecture for 3G RAT interfaced through packet-based FH 815

Single RAT and multi-RAT solutions (one antenna path or multiple antenna path) architecture is presented here for 3G RAT.

x-RAT indicates RATs supporting FS-7.2x. In addition, each architecture can support multiple component carriers from one or different type FS-8 RATs (homogeneous or heterogeneous combination of 2G and 3G RATs).

Thus, FIG. 1.1A presents a system and architecture of a radio FH interface, i.e., FH 815, capable of carrying RATs supporting FS-8 (2G) along with FS-7.2x (not mandatory to be active in the system). FIG. 1.1B presents O-DU 805 and O-RU 810 architectures for FH 815 support FS-8 RATs with or without FS-7.2x RATs in a mix of single and multimode operation. For example, FS-8 RAT is 2G and FS-7.2x RAT is LTE or NR.

O-DU 805 Architecture includes FS-8 RAT Standard L1 processing blocks, e.g., for 2G they are:
 (a) TCH (Traffic Channel) 100/CCH (control Channel) 101 generation/reception;
 (b) Encoding/Decoding & Interleaving/de-interleaving (Module 102);
 (c) burst handling, multiplexing/de-multiplexing (Module 103);
 (d) encoding and modulation/demodulation functions (Module 104);
 (e) additional DFE (digital front end) functions (Module 105): Sample rate change, frequency hopping, power control, AGC, multicarrier configurations, IQ compression/decompression operations (optional); and
 (f) FH interface functions & Realtime Control (Module 106) (i.e., Packet based FH interface data, control and management, sync).

O-RU 810 Architecture includes FS-8 RAT radio processing blocks, e.g., for 2G they are:
 (a) FH interface functions & Realtime Control (Module 107) (i.e., Packet based FH interface data, control and management, sync);
 (b) IQ compression/De-compression (Module 108) (optional);
 (c) Processing to convert to time domain IQ (Module 120); and
 (d) additional DFE processing (Module 110).

O-DU 805 and O-RU 810 communicate via FH 815, which is represented as an IP/ETH cloud.

x-RAT and X-DU 111 indicates RATs supporting FS-7.2x. In addition, each architecture can support multiple component carriers from one or different type FS-8 RATs (homogeneous or heterogeneous combination of 2G and 3G RATs).

X-DU 111 Architecture includes FS-7.2 X-RAT Standard L1 processing blocks (Module 112) and the fronthaul interface functions and real time control functions (Module 113).

Timing is provided to the 2G/3G RAT and the X-RAT from a common timing source Grand Master (GM) 400.

Shared O-RU 810 is an RU that has the capability to concurrently support more than one type of RAT.

X-RAT RU Architecture includes:
 (a) IP packet-based fronthaul interface data, control and management, sync (Module 107);
 (b) IQ Decompression (Module 108);
 (c) FS-7.2 X-RAT Standard Lower-Physical layer processing blocks (Module 109); and
 (d) DFE processing (Module 110).

FIG. 1.1B is labeled as a multi RAT system over Packet based FH system with independent IQ data paths. This is shown in FIG. 1.1B as two independent IQ data outputs from O-DU 805 and X-DU 111 to the IP/ETH cloud, and then as two separate IQ data inputs to the shared O-RU 810.

FIGS. 1.2A and 1.2B are block diagrams of systems that provide packet-based FH for supporting RATs with FS-8 and FS-7.2x in mix of single and multimode operation. Example FS-8 RAT is 3G.

FIGS. 1.2A and 1.2B represent O-DU 805 and O-RU 810 architectures for packet-based FH Interface to support FS-8 RATs with or without FS-7.2x RATs in a mix of single and multimode operation. Example FS-8 RAT is 3G and FS-7.2x RAT is LTE.

O-DU 805 Architecture includes FS-8 RAT Standard L1 processing blocks, e.g., for 3G they are:
  (a) TCH 200/CCH 201 generation/reception;
  (b) Forward Error Correction (FEC) Encoding/Decoding (Module 202);
  (c) interleaving/de-interleaving, Spreading/De-spreading, Scrambling De-Scrambling (Module 203);
  (d) Modulation and Filtering/Filtering-demodulation functions (Module 204);
  (e) IQ processing to convert to frequency domain and target sample rate and additional DFE functions: Sample rate change/Power control Fast AGC, Multi-carrier Configurations, IQ compression/decompression operations (optional) (Module 205); and
  (f) FH interface functions & Realtime Control (Module 206).

O-RU 810 Architecture includes FS-8 RAT radio processing blocks, e.g., for 3G they are:
  (a) FH interface functions & Realtime Control (Module 207) (i.e., Packet based FH interface data, control and management, sync);
  (b) IQ compression/decompression (optional) (Module 208);
  (c) Processing to convert to time domain IQ (Module 209); and
  (d) additional DFE processing (Module 210).

For FS-7.2x RATs, O-RAN standard in current form lists required processing blocks in both O-DU 805 and O-RU 810 which are not repeated here.

Section 1.3: O-RAN split for DL/UL data transfer for selected FS-8 RATs

FIG. 1.3A is a block diagram of a 2G DL/UL O-RAN split. FIG. 1.3B is a block diagram of a 3G DL/UL O-RAN split. FS-8 RATs can apply additional processing in O-DU 805 that will allow FH 815 to transport time domain IQ data which could be synonymous to current O-RAN standards for 4G and 5G, which carries frequency domain IQ data over FH 815.

A User Plane (U-Plane) packet is defined for FS-8 RAT IQ data transfer over O-RAN FH interface.

FIG. 2 presents an O-RAN U-Plane header definition along with a description table for modified header fields for FS-8 RATs 2G and 3G.

An O-RAN compliant U-Plane frame structure enabling FS-8 IQ data transfer over FH 815 is presented below. One option is to align the frame structure with O-RAN U-Plane packet for LTE/NR. For this option, U-Plane header field formats with their interpretations are shown in FIG. 2. In the subsequent description we take up this approach and discuss U-Plane adaptations for 2G/3G RAT operations.

In another embodiment, we can optimize a U-Plane packet to enable the 2G/3G RAT operations where in SectionId, rb, symInc can be removed from the U-plane packet. The motivation is that there is no need to try to maintain backward compatibility (except for transport header) since this RAT may employ separate processing at the O-RU.

Bit fields interpretations shown in FIG. 2 can be used along with existing definitions for multi-RAT operations (FS-8 and FS-7.2x). With this packet structure, support inclusion will enable O-RAN standard to support FS-8 RATs in addition to FS-7.2x RATs.

The same U-Plane packet format can be used for IQ data and associated U-Plane for any RAT from FS-8 configuration category, and O-RU 810 can use the defined fields to segregate respective U-Plane packets and process as per functions shown in FIGS. 1.1A and 1.1B, or FIGS. 1.2A and 1.2B. Any additional control information needed can be added to the reserved bit fields which can be accommodated within the frame format for U-Plane. No C-Plane packets are needed for U-Plane data processing in O-RU except O-RU power control via C-Plane Type-0 packets from O-DU 805.

FIG. 3 is a table of O-RAN compliant U-Plane header field definitions for 2G/3G operations. Each bit filed is interpreted to represent 2G/3G RAT U-Plane packets without any ambiguity at O-RU 810. FIG. 3 shows bit level descriptions for each header field in the U-Plane ORAN header to carry FS-8 IQ data which is necessary for processing at O-RU. Definitions of the bitfields in the column named "2G/3G Interpretation" will be applied with similar meaning for all the FS-8 RATs. These definitions enable O-RAN standard to cater to RATs supporting FS-8 without impacting existing FS-7.2x RATs.

The following embodiments differentiate the RAT type.

Embodiment 1: Keep the payloadVersion definition as is in O-RAN standard and indicate via M-Plane parameter exchange the RAT type (part of M-Plane messaging). RATs can be differentiated by allocating dedicated endpoints (eAxC IDs) to different RATs.

Embodiment 2: Keep the payloadVersion definition as in O-RAN standard. Add 2G and 3G RATs to section extension 9. Modify section extension 9 definition to be used for RAT identification rather than only RAT identification for DSS.

Embodiment 3: Use payloadVersion to indicate the RAT type to O-RU 810 as shown in FIG. 3.
  1—FS 7.2x
  2—FS 8 eCPRI Header Definition for FS-8 RATs

FIG. 4 shows eCPRI header fields representation for FS-8 RATs 2G and 3G U-Plane packets, and also shows usage of the existing eCPRI packet header fields definitions that can be applicable to both ORAN U-Plane and C-Plane Type-0 packets. Changes in the header field interpretation accommodate 2G/3G RATs operations without impacting FS-7.2x RAT 4G and 5G operations.

RoE Header Definition for FS-8 RATs

Usage of existing RoE packet header fields will enable RoE FH to carry FS-8 O-RAN U-Plane packets. These changes in the header field interpretation enable FS-8 RAT operation without impacting FS-7.2x 4G and 5G RAT operations.

FIG. 5 is a representation of RoEorderinfo header fields for 2G and 3G U-Plane and C-Plane Type-0 packets. U-plane sequence Id generation is required.

PRACH Processing for RATs Supporting FS-8

In O-RU 810, for FS-8 RATs, there is no requirement for separate RACH IQ processing. Hence, O-RU 810 does not have to send any U-Plane message to O-DU 805, and related control (C-Plane message) from O-DU 805 is not needed at O-RU 810. This is consistent with the RU-DU functional split architecture for the FS-8 RATs shown in FIGS. 1.1A and 1.2A.

Control Information (C-Plane) Packets Structure for FS-8 RATs

No Real-Time Control Information (C-Plane) for FS-8 RAT downlink and uplink U-Plane Operations.

Based on the DL and UL processing functions of the FS-8 RATs, unlike 4G and 5G, real time control information is not needed for the 2G and 3G U-Plane operations. Thus, no C-Plane definitions are needed for U-Plane IQ processing in O-RAN for FS-8 RAT operation. All required configurations are static in nature and are carried over management plane (M-Plane) at the connection establishment time and remain the same during the whole connection period.

C-Plane Type-0 Header Definition for FS-8 RAT Power Control Over FH

C-Plane Type-0 message/frames are used for the power control operations in FS-8 RATs RU. Note that there are no U-Plane messages associated with this C-Plane Type "0".

FIG. 6 is a representation of idle slot scheduling C-Plane frame format (C-Plane Section Type-0). FS-8 RAT related changes and updated definitions of header fields are shown. These changes are additive and will not impact existing FS-7.2x RAT operations.

M-Plane Configuration

Static configurations for U-Plane IQ data processing in O-RU 810 or O-DU 805 are carried over M-Plane information exchange.

O-RAN FH Frame Timing Structure for FS-8 RATs

The FH frame timing structure disclosed herein will be used to carry FS-8 RAT IQ data via U-Plane packets. The existing frame format can be also supported by O-RAN standard alongside on the same eCPRI/RoE and physical medium.

DL and UL Frame/Slot/Symbol Structures

FH Frame duration=10 ms

Number of Subframes in 1 Frame=10

Subframe Duration=1 ms

Number of FS-8 RAT Packets in 1 ms duration=15.

Number of data IQ samples in one FS-8 RAT FH packet:

FH Rate dependent, can be calculated following the equation given as Number of IQ samples per U-Plane packet=$((1e^{-3})*\text{FH rate})/15$, where FH rate is the target IQ sampling rate.

Example number for multiple FH sampling rates are given in Table 1, below.

TABLE 1

Number of data IQ samples in one FH packet for a given FH rate

| | Supported Fronthaul Rate | 1 FS8 Packet Size (Number of IQ Samples pair, Signed 16 bits representation) |
|---|---|---|
| 1 | 3.84 Msps | 256 |
| 2 | 7.68 Msps | 512 |
| 3 | 15.36 Msps | 1024 |
| 4 | 30.76 Msps | 2048 |

Figure 7:
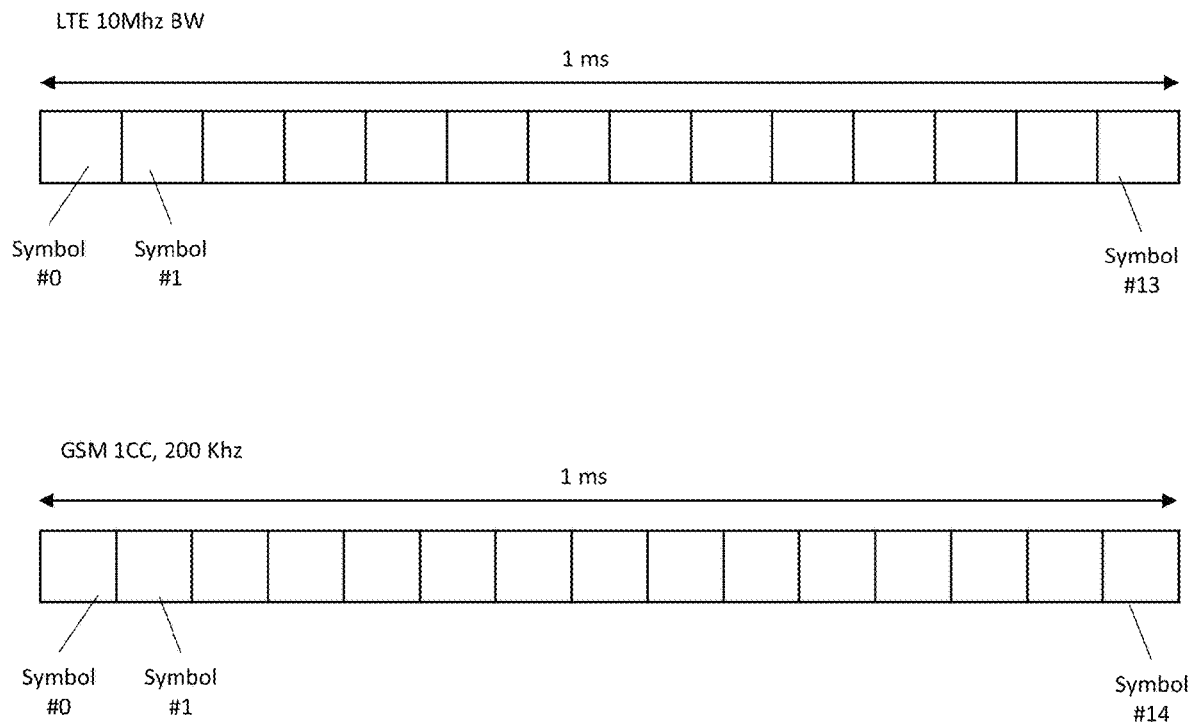
FIG. 7 is a representation of FS-8 RAT FH frame format and relationships with FS-7.2x 4G/5G RATs.

FIG. 7 is a representation of FS-8 RAT FH frame format and relationships with FS-7.2x LTE RAT. FIG. 7 shows timing relationships of the FH U-Plane frames for FS-8 RATs with FS-7.2x LTE RAT. Similar relationships will exist for other FS-8 RATs as well.

IQ Compression for FS-8 RATs U-Plane

Use existing O-RAN standard IQ compression schemes (except modulation compression) for FS-8 RATs U-Plane packets.

Timing and S-Plane Structures for 2G/3G RAT Operations

Table 2, below, shows fronthaul timing calculations to meet the frame structure proposed herein for FS8 RATs with respect to the existing O-RAN compliant S-Plane based IEEE 1588 PTP or SyncE protocol recovered time in O-DU/O-RU.

TABLE 2

GSM frame timing calculations from GPS epoch
Fronthaul Timing -Example 2G RAT

| | |
|---|---|
| time now | 28-nov-2020-10:42:42 |
| GPS epoch | 6-jan-1980-0:0:0 |
| max Frame number | 1.25E+10 |
| Frame Number | 5.43E+09 |
| MultiFrame number | 1146523 |
| SuperFrame number | 52083 |
| Hyperframe number | 1090 |

For FS-8 3G RAT, similar computations can be done at O-DU 805 to match the 3G frame timing. This calculation is done in order to interface with the proposed FH frame structure for the 2G and 3G RATs.

Coexistence of FS-8 RATs and FS-7.2x RATs

A system that is configured as disclosed herein will be ready for coexistence of FS-8 and FS-7.2 RATs on the same O-RU 810 SW/HW/FW. Similar configurations will allow one O-DU 805 SW/HW support for RATs coexistence and parallel operations. In addition, common M-Plane and S-Plane design shared across multiple RATs will help in better O-RU 810 system coordination and power savings.

A method of exchanging user-Plane (U-Plane) data packets between O-DU 805 and O-RU 810 includes defining packet header for FS-8 RATs generated IQ data transfer over a packet-based O-RAN FH interface, i.e., FH 815. Additionally:

(a) U-Plane header field definitions to support FS-8 RATs includes:
(i) Methods to reuse the eCPRI and RoE header fields definitions; and
(ii) O-RAN header fields definitions.

In another embodiment, there is no separate PRACH processing in O-RU 810.

For control information (C-Plane) packet definition for RATs supporting FS-8:

(a) there is no C-Plane need for U-Plane IQ processing in O-RU 810 for both DL and UL.
(i) U-Plane processing information is carried over M-Plane interface.
(b) C-Plane Type-0 header definition provides for power saving in FS-8 RATs.

Additional static configurations necessary for U-Plane IQ data processing in O-RU 810 are carried over management M-Plane.

Front-Haul frame timing and U-Plane packet size definitions support FS-8 RATs over eCPRI/RoE/O-RAN interface.

There is a coexistence of RATs supporting FS-8 and FS-7.2x over packet-based FH interface network, specifically over O-RAN FH.

Exemplary System I

Exemplary system I is a system of operating an enhanced Open Radio Access Network (O-RAN) fronthaul interface, i.e., FH 815, supporting 2G radio access technologies simultaneously or standalone operations along with 3G, 4G and 5G radio technologies. The system includes (a) an O-RAN compliant distributed unit (O-DU 805) sending/receiving IQ sample that is rate adapted to fronthaul link rates, multicarrier processed over wider bandwidths and Time Division Multiple Access (TDMA) framed (frame structure proposed herein) time-domain IQ samples generated from traditional FS-8, and (b) an O-RAN compliant radio unit (O-RU 810) sending/receiving time-domain IQ that is rate adapted to fronthaul link rates, multi-carrier processed over wider bandwidths and TDMA framed time-domain IQ samples generated from traditional FS-8.

In exemplary system I, O-DU 805 executes the following functions:
(a) TCH 100/CCH 101 generation/reception;
(b) Encoding/Decoding & Interleaving/de-interleaving (Module 102);
(c) Burst handling, multiplexing/de-multiplexing (Module 103);
(d) Modulation/demodulation functions (Module 104);
(e) Additional DFE functions: Sample rate change/Power control Fast AGC, Multicarrier Configurations, IQ compression/decompression operations (optional) (Module 105); and
(f) FH interface functions & Realtime Control (Module 106).

In exemplary system I, the O-RU(s) execute the following functions:
(a) FH interface functions & Realtime Control (Module 107);
(b) IQ compression/De-compression (optional) (Module 108); and
(c) Additional DFE processing (Module 110).

Exemplary System II

Exemplary system II is a system of operating an Open Radio Access Network (O-RAN) fronthaul interface, i.e., FH 815, supporting 3G radio access technology simultaneously or standalone operations along with 2G, 4G and 5G radio technologies. The system includes (a) an O-RAN compliant distributed unit (O-DU 805) sending/receiving time-domain IQ samples based on functional split 8, and (b) an O-RAN compliant radio unit (O-RU 810) sending/receiving time-domain IQ samples based on functional split 8.

In exemplary system II, O-DU 805 executes the following functions:
(a) TCH 200/CCH 201 generation/reception;
(b) FEC Encoding/Decoding (Module 202);
(c) Interleaving/de-interleaving, Spreading/De-spreading, Scrambling/De-Scrambling (Module 203);
(d) Modulation-Filtering/Filtering-demodulation functions (Module 204);
(e) Additional DFE functions: Sample rate change/Power control Fast AGC, Multicarrier Configurations, IQ compression/decompression operations (optional) Module (205); and
(f) FH interface functions & Realtime Control (Module 206).

In exemplary system 2, O-RU 810 executes the following functions:
(a) FH interface functions & Realtime Control (Module 207);
(b) IQ compression/decompression (Module 208) (optional); and
(c) Additional DFE processing (Module 210).

Exemplary System III

Exemplary system III is a system of operating an Open Radio Access Network (O-RAN) fronthaul interface, e.g., FH 815, supporting 2G or 3G radio access technology or both simultaneously or standalone operations along with 4G and 5G radio technologies. The system includes (a) an O-RAN compliant distributed unit (O-DU 805) sending/receiving time-domain IQ samples based on functional split 8; and (b) an O-RAN compliant radio unit (O-RU 810) sending/receiving time-domain IQ samples based on functional split 8.

In exemplary system III, O-RU 810 can differentiate between different RATs by:
(a) Allocating dedicated endpoints or eAxC IDs to different RATs;
(b) Indicating to O-RU 810 the RAT of the associated C-Plane and U-Plane packets by using appending section extension 9 to the C-Plane messages; and
(c) Using the payload version in the application header to differentiate between different RATs.

In exemplary systems I, II and III, the PRACH signal is processed using the same chain of other data traffic in O-RU 810.

In exemplary systems I, II and III, control information is indicated via M-Plane and no real-time C-Plane packets are sent along with the U-Plane packets.

In exemplary systems I, II and III, C-Plane section type 0 can be used to indicate unused RBs or symbols.

In exemplary systems I, II and III, compression schemes (except modulation compression) defined in O-RAN can be used for 2G/3G RATs and configured statically.

In exemplary systems I, II and III, FS-8 2G RAT specific frequency hopping over wideband operations can be implemented in O-DU 805 SW allowing further system design flexibility.

In exemplary systems I, II and III, FS-8 RAT specific multicarrier signal formation in DL and multicarrier segregation in the UL can be implemented in O-DU SW allowing further system design flexibility.

The methods/processes described herein can be performed by an apparatus that is configured of electronic circuitry, which may be implemented with discrete components, or may include a processor and a memory. The processor is an electronic device, e.g., digital circuitry, that executes instructions. The memory is a storage device, e.g., electronic, that is readable by the processor. The memory includes instructions, i.e., a program module, that when read by the processor, cause the processor to execute the methods/processes described herein. The apparatus can be (a) a component of an O-RAN that is communicatively coupled to one or more other components of the O-RAN, or (b) embedded in a component of the O-RAN, (c) distributed among components of the O-RAN in a distributed processing system, or (d) a component that is external to the O-RAN and communicatively coupled to one or more components of the O-RAN. For example, the discrete components or the processor and memory may be components of O-RU 810 or O-DU 805, or distributed among O-RU 810 and O-DU 805. The instructions can also be stored on an external storage device and copied from the external storage device to the memory.

In summary, the present document provides for an Open Radio Access Network (O-RAN) that includes FH 815, over which O-DU 805 and O-RU 810 communicate with one another and exchange O-RAN standard defined user-plane (U-plane) packets and control-place (C-Plane) packets. FH 815 carries control and management information via management-pane (M-Plane) message exchange, and timing synchronization is achieved in accordance with synchronization-plane (S-Plane) procedures, and the O-RAN accommodates communications via 2G and 3G based mobile networks.

O-DU 805 and O-RU 810 support FS-8 radio access technology (RAT), 2G and 3G RAT, and 7.2 x-RAT to co-exist in the O-RAN.

O-DU 805 includes FS-8 radio access technology (RAT) Standard L1 processing blocks for 2G. The processing blocks include one or more blocks for:
  (a) traffic channel (TCH) 100/control channel (CCH) 101 generation/reception;
  (b) encoding/decoding and interleaving/de-interleaving (Module 102);
  (c) burst handling, multiplexing de-multiplexing (Module 103);
  (d) modulation/demodulation functions (Module 104);
  (e) sample rate change/power control fast automatic gain control (AGC) (Module 105);
  (f) multicarrier configurations (Module 105);
  (g) IQ compression/decompression operations (Module 105); and
  (h) fronthaul interface functions and realtime control (Module 106).

The O-RU 810 includes FS-8 radio access technology (RAT) radio processing blocks for 2G. The processing blocks include one or more blocks for:
  (a) fronthaul interface functions and realtime control (Module 107);
  (b) IQ compression/de-compression (Module 108); and
  (c) digital front end processing (Module 110).

O-DU 805 includes FS-8 radio access technology (RAT) Standard L1 processing blocks for 3G. The processing blocks include one or more blocks for:
  (a) traffic channel (TCH) 200/control channel (CCH) 201 generation/reception;
  (b) FEC encoding/decoding (Module 202);
  (c) interleaving/de-interleaving, spreading/de-spreading, scrambling de-scrambling (Module 203);
  (d) modulation-filtering/filtering-demodulation functions (Module 204);
  (e) sample rate change/power control fast automatic gain control (AGC) (Module 205);
  (f) multicarrier configurations (Module 205);
  (g) IQ compression/decompression operations (Module 205); and
  (h) fronthaul interface functions and realtime control (Module 206).

O-RU 810 includes FS-8 radio access technology (RAT) radio processing blocks for 3G. The processing blocks include one or more blocks for:
  (a) fronthaul interface functions and realtime control (Module 207);
  (b) IQ compression/decompression (Module 208); and
  (c) digital front end processing (Module 210).

O-RU 810 does not include separate physical random-access channel (PRACH) processing for 2G and 3G radio access technology (RAT).

FH 815 accommodates IQ downlink/uplink (DL/UL) data transfer between O-DU 805 and O-RU 810 for FS-8 radio access technology (RAT).

FH 815 utilizes U-Plane frame structure and header field formats to carry FS-8 radio access technology (RAT) IQ samples to/from O-RU 810 over FH 815 without changing a frame structure for carrying FS7.2 x-RAT IQ samples to/from O-RU 810 over FH 815.

FH 815 utilizes U-Plane header field definitions for 2G/3G operations.

FH 815 has no requirement for a C-plane message for U-Plane data processing in O-RU 810, except O-RU 810 power control via C-Plane Type-0 packets from O-DU 805. This leads to lower bandwidth requirements on FH 815.

The U-Plane packets are optimized for 2G/3G.

Acronyms

3GPP: 3rd Generation Partnership Project
AGC: Automatic gain control
BS: Base Station
CAPEX: Capital expenditures
CCH: Control channel
CPRI: Common Public Radio Interface
CUS-Plane: Control, user, and synchronization plane
C&M: Control and Management
DL: Downlink
DU: Distributed Unit
eCPRI: Enhanced Common Public Radio Interface
eNB: eNodeB (4G LTE base station)
FEC: Forward error correction
FH: Fronthaul
FS: Functional split
FW: Firmware
gNB: gNodeB (5G NR base station)
GPS: Global positioning system
HW: Hardware
IQ: In-phase Quadrature-phase
M-Plane: Management plane
NR: New Radio
O-CU: O-RAN compliant Centralized Unit
O-DU: O-RAN compliant Distributed Unit
O-RAN: Open Radio Access Network
O-RU: O-RAN compliant Radio Unit
OPEX: Operating expenses
PRACH: Physical random-access channel
PRB: Physical resource block
PTP: Precision time protocol
RACH: Random Access Channel
RAN: Radio Access Network
RAT: Radio Access Technology
RE: Resource Element
RoE: Radio over Ethernet
RU: Radio Unit
SMO: Service Management and Orchestration
SW: Software
SyncE: Synchronous Ethernet
TCH: Traffic channel
UL: Uplink Definitions C-Plane: Control Plane: refers to real time control messages for the sending/receiving of the U-plane packets between an O-DU and an O-RU.
Channel: A contiguous frequency range between lower and upper frequency limits.
DL: DownLink: Data flow towards a radiating antenna (generally on an LLS interface).
LLS: Lower Layer Split: logical interface between an O-DU and an O-RU when using a lower layer (intra-PHY based) functional split.
M-Plane: Management Plane: refers to non-real-time management operations between an O-DU and an O-RU.
O-CU: O-RAN Control Unit—a logical node hosting PDCP, RRC, SDAP and other control functions.
O-DU: O-RAN Distributed Unit: a logical node hosting RLC/MAC/High-PHY layers based on a lower layer functional split.
O-RU: O-RAN Radio Unit: a logical node hosting Low-PHY layer and RF processing based on a lower layer functional split. This is similar to 3GPP's "TRP" or "RRH" but more specific in including the Low-PHY layer (FFT/iFFT, PRACH extraction).

OTA: Over the Air.

S-Plane: Synchronization Plane: refers to traffic between an O-DU or an O-RU to a synchronization controller which is generally an IEEE 1588 Grand Master (however, Grand Master functionality may be embedded in the O-DU).

U-Plane: User Plane: refers to IQ sample data transferred between an O-DU and an O-RU.

UL: UpLink: Data flow away from the radiating antenna (generally on the LLS interface).

The techniques described herein are exemplary, and should not be construed as implying any particular limitation on the present disclosure. It should be understood that various alternatives, combinations and modifications could be devised by those skilled in the art. For example, operations associated with the processes described herein can be performed in any order, unless otherwise specified or dictated by the operations themselves.

The terms "comprises" or "comprising" are to be interpreted as specifying the presence of the stated features, integers, operations or components, but not precluding the presence of one or more other features, integers, operations or components or groups thereof. The terms "a" and "an" are indefinite articles, and as such, do not preclude embodiments having pluralities of articles.

What is claimed is:

1. An Open Radio Access Network, O-RAN, comprising:
a fronthaul, FH, interface over which an O-RAN Distributed Unit, O-DU, and an O-RAN Radio Unit, O-RU, communicate with one another and exchange O-RAN standard defined user-plane, U-plane, packets and control-place, C-Plane, packets,
wherein said fronthaul interface carries control and management information via management-pane (M-Plane) message exchange, and timing synchronization is achieved in accordance with synchronization-plane (S-Plane) procedures, and
wherein said O-RAN accommodates communications via 2G and 3G based mobile networks, wherein said O-DU for a 2G based mobile network comprises modules for functions:
 (a) TCH (Traffic Channel)/CCH (Control Channel) for generation/reception;
 (b) encoding/decoding and interleaving/de-interleaving;
 (c) burst handling, multiplexing/de-multiplexing;
 (d) encoding and modulation/demodulation functions;
 (e) additional DFE (digital front end) functions; and
 (f) FH interface functions and real time control; and
wherein said O-DU for a 3G based mobile network comprises modules for functions,
 (a) TCH/CCH generation/reception;
 (b) Forward Error Correction (FEC) encoding/decoding;
 (c) interleaving/de-interleaving, spreading/de-spreading, scrambling de-scrambling;
 (d) modulation and filtering/filtering-demodulation functions;
 (e) processing to convert to frequency domain and target sample rate and additional DFE functions; and
 (f) FH interface functions and real time control.

2. The O-RAN of claim 1, wherein said O-DU and said O-RU support functional split-8 (FS-8) radio access technology (RAT), 2G and 3G RAT, and 7.2 x-RAT to co-exist in said O-RAN.

3. The O-RAN of claim 1, wherein said O-RU comprises FS-8 radio access technology (RAT) radio processing blocks for 2G.

4. The O-RAN of claim 3, wherein said FS-8 RAT radio processing blocks comprise:
 (a) fronthaul interface functions and real time control;
 (b) IQ compression/de-compression; and
 (c) digital front end (DFE) processing.

5. The O-RAN of claim 1, wherein said O-RU comprises FS-8 radio access technology (RAT) radio processing blocks for 3G.

6. The O-RAN of claim 5, wherein said FS-8 RAT radio processing blocks comprise:
 (a) fronthaul interface functions and real time control;
 (b) IQ compression/de-compression; and
 (c) DFE processing.

7. The O-RAN of claim 1, wherein said O-RU processes for 2G and 3G radio access technology (RAT) without the use of physical random-access channel (PRACH).

8. The O-RAN of claim 1, wherein said fronthaul interface accommodates IQ downlink/uplink (DL/UL) data transfer between said O-DU and said O-RU for FS-8 radio access technology (RAT).

9. The O-RAN of claim 8, wherein said fronthaul interface utilizes U-Plane frame structure and header field formats to carry FS-8 radio access technology (RAT) IQ samples to/from said O-RU over said fronthaul interface with a frame structure compatible for carrying FS7.2 x-RAT IQ samples to/from said O-RU over said fronthaul interface.

10. The O-RAN of claim 8, wherein said fronthaul interface utilizes U-Plane header field definitions for 2G/3G operations.

11. The O-RAN of claim 8, wherein said fronthaul interface only has a requirement for a C-plane message for U-Plane data processing in said O-RU for O-RU power control via C-Plane Type-0 packets from said O-DU.

* * * * *